United States Patent Office 2,878,233
Patented Mar. 17, 1959

2,878,233

EPOXY RESINS INCLUDING DIIMIDAZOLINE CURING AGENTS

Stuart A. Harrison, Minneapolis, Minn., assignor to General Mills, Inc., a corporation of Delaware No Drawing. Application March 11, 1957
Serial No. 644,972

5 Claims. (Cl. 260—47)

This invention relates to novel compositions containing epoxy resins and diimidazolines derived from aromatic carboxylic acids.

Various coreactants with epoxy resins are now commercially available. Each of these have certain advantages and disadvantages and their applications are limited accordingly. The diimidazoline coreactants taught by this invention have many advantages and improvements not heretofore obtainable with known coreactants. Among these advantages are greatly improved heat distortion temperatures, non-volatility, and low toxicity. Other advantages to these coreactants will become apparent upon reading the subsequent specification.

Basically the compositions of this invention are those which contain an epoxy resin having an epoxy equivalency of at least 100 and an imidazoline of the general structural formula,

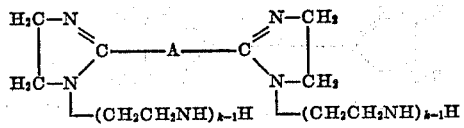

where $k$ is an integer and A is an aromatic nucleus.

The epoxy resins (glycidyl ethers) employed in this invention are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acteone, methyl ethyl ketone, and the like. A typical epoxy resin is the reaction product of epichlorohydrin and 2,2-bis(p-hydroxy phenyl) propane (bisphenol A), the resin having the following theoretical structural formula,

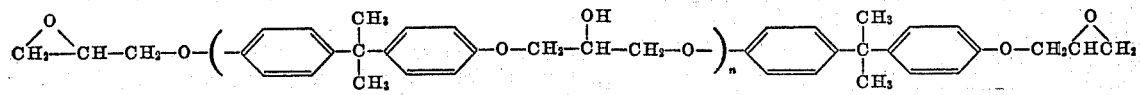

where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one mole of the epoxy group or one gram equivalent of epoxide. For purposes of this invention epoxy resins having an epoxy equivalency of 100 to 1600 are suitable, the preferred range being 180 to 400.

The diimidazolines employed in this invention are derived from aromatic dibasic acids and polyamines. Suitable dibasic acids are ortho-phthalic (phthalic), meta-phthalic (iso-phthalic), and para-phthalic (terephthalic).

Polyamines which may be employed in this invention have the following structural formula, $$H_2N(CR_2CR_2NH)_kH$$

where $k$ is an integer less than 6 and R is hydrogen or a lower alkyl radical. Illustrative polyamines are ethylene-diamine, diethylene triamine, triethylene tetramine, tetraethylene pentamine, di-1,2-propane triamine, and the like or mixtures thereof.

This invention may be illustrated further by reference to the following examples in which all "parts" are expressed as percent by weight, unless specified otherwise.

*Example 1*

The following materials were charged to a one liter three-necked flask equipped with mechanical stirrer, thermometer, short column and a condenser adapted to collect the volatile materials evolved:

|  | G. |
|---|---|
| Isophthalic acid | 166 |
| Diethylene triamine | 235 |

The mixture was stirred and heated according to the following schedule:

| Reaction Time in Minutes (Totals) | Pot Temperature, degrees | Volatile Matter [1] Recovered, cc. |
|---|---|---|
|  | 196 | 2 |
| 35 | 210 | 50 |
| 90 | 268 | 112 |
| 170 | 300 | 122 |

[1] Primarily water with some amine in the last fraction.

The mixture was cooled and an additional 235 g. of diethylene triamine was added. The mass was again heated and stirred as follows:

| Reaction Time in Minutes (Totals) | Pot Temp. (° C.) | Vapor Temp.[1] (° C.) | Volatile [2] Products, cc. |
|---|---|---|---|
|  | 211 | 24 | 0 |
| 100 | 214.5 | 134 | 0 |
| 150 | 218 | 171 | 2 |
| 220 | 223 | 202 | 9 |
| 280 | 230 | 205 | 65 |
| 320 | 279 | 209 | 208 |
| 346 | 315 | 197 | 221 |

[1] Temperature at the top of column.
[2] The distillate was nearly all polyamine.

The product was a brown solid at room temperature and had an acid value of 0.4 and an amine number of 615. The amine number is an expression of the number of milligrams of potassium hydroxide equivalent to the free amine groups in a one gram sample.

The diimidazoline was then reacted with an epoxy resin desrived from bis-phenol A and epichlorohydrin having an epoxy equivalency of 200 by heating the mixture at 150° C. for 3 hours. The results and ratios of reactants were as follows:

| Parts Diimid-azoline | Parts Epoxy Resin | HDT,[1] degrees | Ultimate Flexural Strength, p. s. i. |
|---|---|---|---|
| 15 | 85 | 147 | 7,800 |
| 20 | 80 | 160 | 13,200 |
| 25 | 75 | 148 | 11,800 |

[1] Heat distortion temperature.

Example II 8 parts of the diimidazoline prepared as shown in Example I was mixed with 100 parts of an amino-polyamide having an amine number of about 300; 30 parts of this mixture was then blended with 70 parts of epoxy resin derived from bis-phenol A and epichlorohydrin and having an epoxy equivalency of about 195 and cured for 4 hours at 300° F. The heat distortion temperature was 103° C. whereas the heat distortion temperature of a similar mixture without the diimidazoline was 81° C.

Example III 166 g. (1 mole) of isophthalic acid, and 515 g. (5 moles) of diethylene triamine were charged to a one liter 3 necked flask equipped with a mechanical stirrer, thermometer to measure pot temperature and a short Vigreaux column attached to a downward condenser.

The mixture was heated and stirred, holding it at about 200° C. for six hours and then raising to a maximum of 304° in another two hours. About 69 g. of water was eliminated during the heating. The mixture was stripped of unreacted polyamine by heating to 200° C. under water pump vacuum (about 20 mm. press).

The product remaining was an extremely viscous liquid which could be poured at 90–100° C. It weighed 283 g., had an amine number of 599.7, and an acid value of 2.3 and contained 25.4% nitrogen.

20 parts of this product when mixed and cured at 150° C. for three hours with 80 parts of epoxy resin derived from bis-phenol A and epichlorohydrin and having an epoxy equivalency of about 180 gave a casting having the following physical properties:

Barcol hardness _____ 79
Heat distortion temperature _____ ° C__ 151
Ultimate flexural strength _____ p. s. i__ 6,950

Example IV

Two moles of triethylene tetramine and 1 mole of isophthalic acid were reacted according to the procedure shown in Example III. The resulting product weighed 363 grams. This product had an amine number of 610, an acid value of 3.8, and a ball and ring melting point of 30.2° C. and contained 25.7% nitrogen.

A mixture of 15 parts of this product and 85 parts of an epoxy resin derived from bis-phenol A and epichlorohydrin having an epoxy equivalency of about 180 upon being cured for 3 hours at 150° C. produced a casting having a Barcol hardness of 71, a heat distortion temperature of 158° C., and a flexural strength of 6,600 p. s. i.

Example V

Two moles of tetraethylene pentamine and one mole of isophthalic acid were reacted according to the procedure shown in Example III. The resulting product weighed 474 grams. The product had an amine number of 561.6, an acid value of 2.8, and a ball and ring melting point of 29° C. and contained 26.8% nitrogen.

A mixture of 20 parts of this product and 80 parts of an epoxy resin derived from bis-phenol A and epichlorohydrin having an epoxy equivalency of about 180 upon being cured for 3 hours at 150° C. produced a casting having a Barcol hardness of 74, a heat distortion temperature of 139° C. and an ultimate flexural strength of 12,500 p. s. i.

Example VI

Two moles of tetraethylene pentamine and one mole of dimethyl terephthalate were reacted according to the procedure shown in Example III. The resulting product weighed 475 grams, had an amine number of 591.4, an acid value of 6.6, and a ball and ring melting point below 22° C. and contained 25.8% nitrogen.

A mixture of 20 parts of this product and 50 parts of an epoxy resin derived from bis-phenol A and epichlorohydrin having an epoxy equivalency of about 180 upon being cured at 150° C. for three hours produced a casting having a Barcol hardness of 73, heat distortion temperature of 128, and an ultimate flexural strength of 13,500 p. s. i.

The amino-polyamide used in Example II was prepared by reacting polymeric fat acids (predominantly di-linoleic acid) and a mixture of triethylene tetramine and diethylene triamine. In fact any of the polyamines listed above may be utilized to prepare these amino-polyamides and their amine number will vary according to the amount and type utilized.

The preferred compositions of this invention are those in which the ratio of coreactants is in the range of 3 to 5 parts of epoxy resin to one part of diimidazoline.

It will be appreciated by those familiar with epoxy resin coreactants that the heat distortion temperature demonstrated by the above products is an important characteristic and one which is unexpected when compared to the closest analagous coreactants. Accordingly, these compositions are especially useful as laminants for glass-reinforced plastics, potting compounds, structural adhesives of high heat resistance, surface coatings, and casting compounds.

Many modifications and variations of the invention as hereinbefore set forth may be made without departing from the spirit and scope thereof and only such limitations should be impoesd as are indicated in the appended claims.

I claim as my invention:

1. A composition of matter containing (a) epoxy resin having an epoxy equivalency of at least 100 and (b) a diimidazoline of the general structural formula,

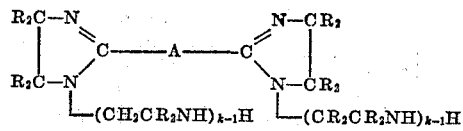

where A represents an aromatic nucleus, R is selected from the group consisting of hydrogen and methyl, and $k$ is an integer of from 1–5, said epoxy resin being a glycidyl ether of a polyhydric phenol.

2. The compositions of claim 1 in which the epoxy resin is a reaction product of bis-phenol A and epichlorohydrin.

3. A composition of matter containing (a) epoxy resin having an epoxy equivalency of at least 100 and (b) a diimidazoline of the general structural formula,

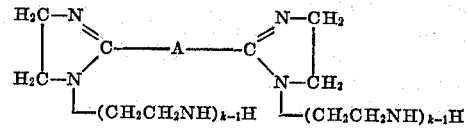

where A represents an aromatic nucleus and $k$ is an integer of from 1–5, said epoxy resin being a glycidyl ether of a polyhydric phenol.

4. A composition of matter containing (a) an epoxy resin having an epoxy equivalency of at least 100 and (b) a diimidazoline of the general structural formula,

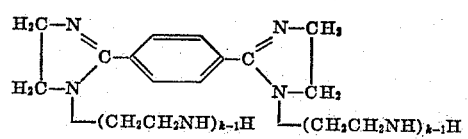

where $k$ is an integer of from 1–5, said epoxy resin being a glycidyl ether of a polyhydric phenol.

5. A composition of matter containing (a) an epoxy resin having an epoxy equivalency of at least 100 and (b) a diimidazoline of the general structural formula,

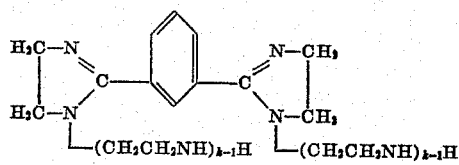

where $k$ is an integer of from 1-5, said epoxy resin being a glycidyl ether of a polyhydric phenol.

References Cited in the file of this patent

UNITED STATES PATENTS

| | | |
|---|---|---|
| 2,637,716 | Ott | May 5, 1953 |
| 2,712,535 | Fisch | July 5, 1955 |
| 2,743,256 | De Groote | Apr. 24, 1956 |

OTHER REFERENCES

Columbia Encyclopedia, 2nd edition, Columbia University Press (1950), page 2196.